US006687890B2

(12) United States Patent
Sato (10) Patent No.: US 6,687,890 B2
(45) Date of Patent: Feb. 3, 2004

(54) METHOD FOR LAYOUT DESIGN AND TIMING ADJUSTMENT OF LOGICALLY DESIGNED INTEGRATED CIRCUIT

(75) Inventor: Hiroshi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 10/033,938

(22) Filed: Jan. 3, 2002

(65) Prior Publication Data

US 2002/0157074 A1 Oct. 24, 2002

(30) Foreign Application Priority Data

Apr. 13, 2001 (JP) ......................................... 2001-114709

(51) Int. Cl.⁷ ............................................. G06F 17/50
(52) U.S. Cl. .................................. 716/10; 716/8; 716/9; 716/11; 716/20
(58) Field of Search ............................. 716/8, 9, 10, 11, 716/20

(56) References Cited

U.S. PATENT DOCUMENTS

| | | | | | |
|---|---|---|---|---|---|
| 5,055,710 A | * | 10/1991 | Tanaka et al. | ................. | 326/47 |
| 5,257,223 A | * | 10/1993 | Dervisoglu | .................. | 365/154 |
| 5,717,700 A | * | 2/1998 | Crouch et al. | ............... | 714/726 |
| 5,812,561 A | * | 9/1998 | Giles et al. | .................. | 714/726 |
| 6,006,348 A | * | 12/1999 | Sode et al. | .................. | 714/731 |
| 6,389,566 B1 | * | 5/2002 | Wagner et al. | ............... | 714/726 |

FOREIGN PATENT DOCUMENTS

| | | |
|---|---|---|
| JP | 07-262254 | 10/1995 |
| JP | 2000-148809 | 5/2000 |

* cited by examiner

Primary Examiner—Vuthe Siek
Assistant Examiner—Sun James Lin

(57) ABSTRACT

Reading out data of a logically designed circuit (S1); replacing flip-flops in the circuit with respective scan flip-flops with LUL, and cascading the scan flip-flops with LUL with respect to scan-in and scan-out to form a scan circuit (S2); laying out the changed logically designed circuit (S3); replacing the scan flip-flops with LUL with ordinary scan flip-flops (S4); performing a static timing analysis (S6); and if timing error occurs, replacing a corresponding ordinary scan flip-flop with a scan flip-flop with LUL (S7).

12 Claims, 11 Drawing Sheets

METHOD FOR LAYOUT DESIGN AND TIMING ADJUSTMENT OF LOGICALLY DESIGNED INTEGRATED CIRCUIT

BACKGROUND OF THE INVENTION

1. Field of the Invention

The present invention relates to a method for layout design and timing adjustment of a logically designed integrated circuit, particularly an ASIC (Application-Specific Integrated Circuit) using a gate array, that can be automatically laid out with a computer.

2. Description of the Related Art

With development to a higher degree of integration and function in semiconductor integrated circuit, a circuit scale thereof has increased, leading to a tremendous number of test patterns for failure detection. In order to attain a higher failure detection rate with a smaller number of test patterns, a scan pass method has been adopted for a semiconductor integrated circuit.

Figure 3:
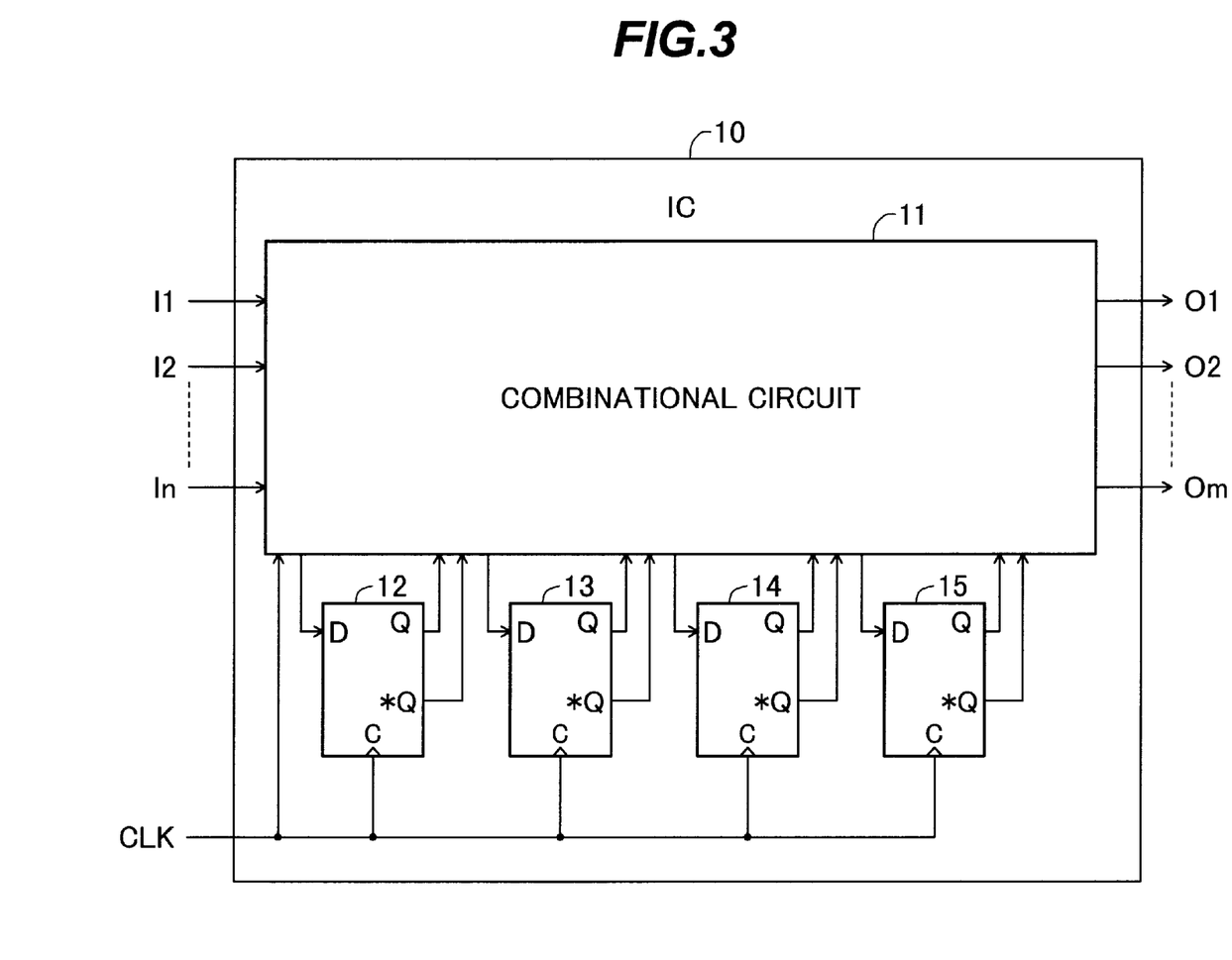
FIG. 3 is an illustration of step S1 in FIG. 2.
Figure 5:
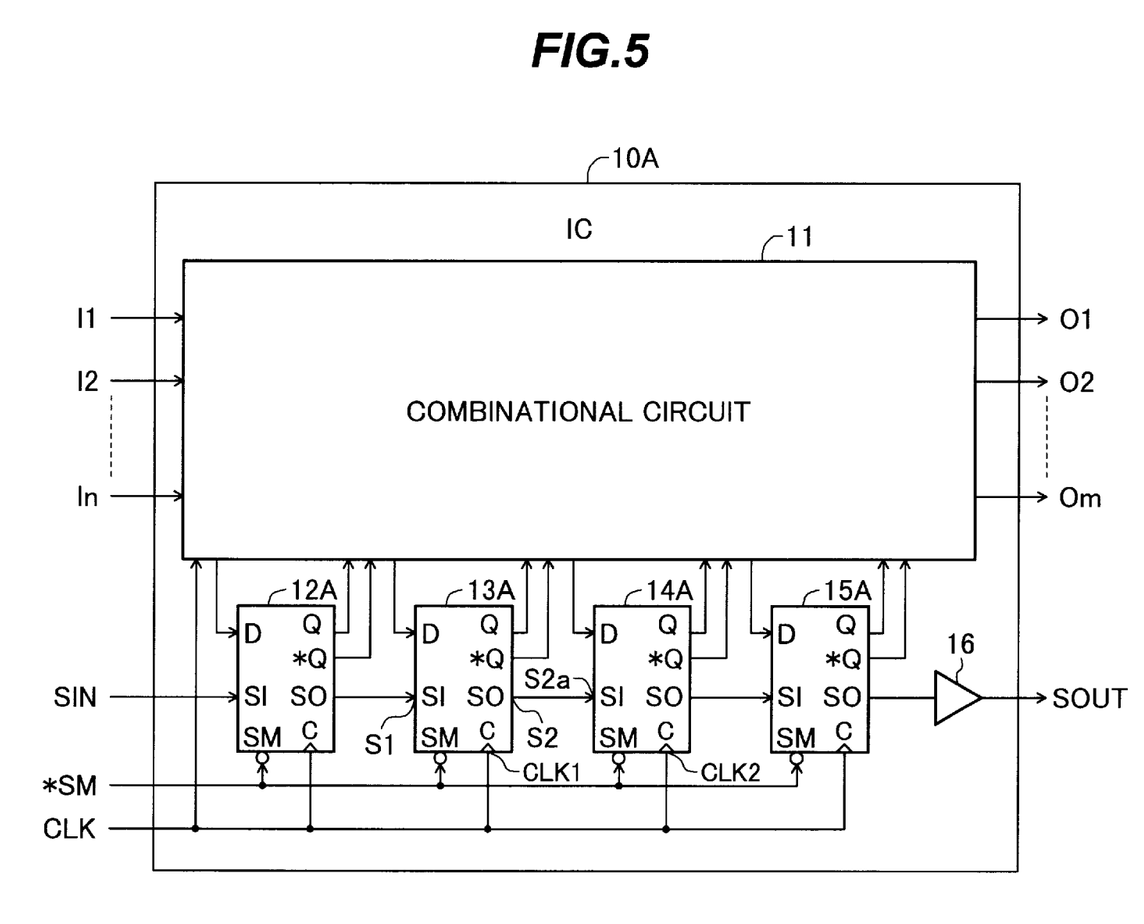
FIG. 5 is an illustration of step S4 in FIG. 2.
Figure 6:
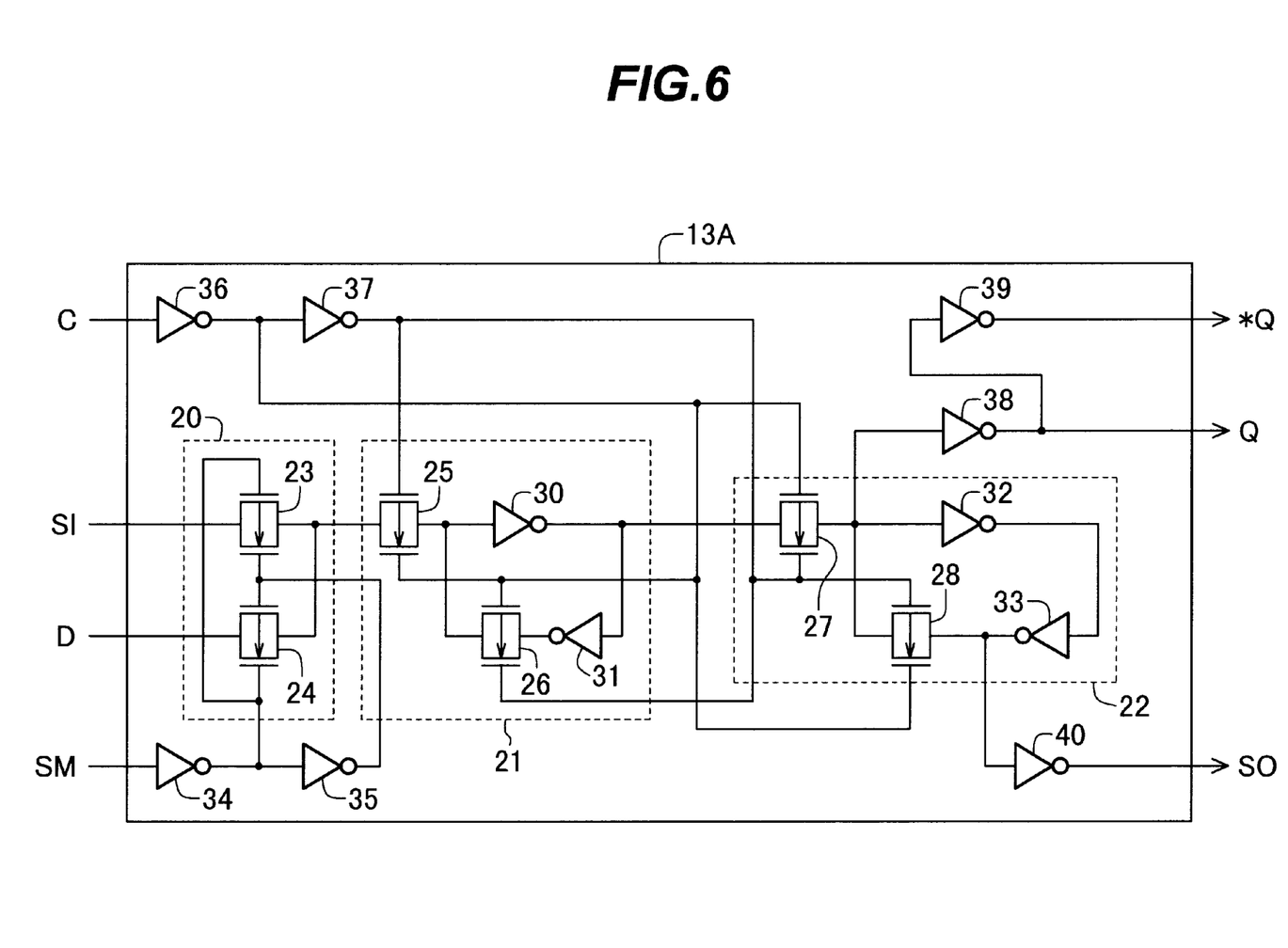
FIG. 6 is a circuit diagram of a scan flip-flop.

According to this method, in a case where an integrated circuit 10 as shown in FIG. 3 is logically designed, flip-flops 12 to 15 connected to a combinational circuit 11 are, as shown in FIG. 5, replaced with scan flip-flops (scan flip-flop) 12A to 15A having a normal operation mode and a scan mode, and the scan flip-flops 12A to 15A are cascaded to form a scan circuit. Each of the scan flip-flops 12A to 15A is of the same configuration and configured as shown in FIG. 6 for example. Although in FIG. 5, a circuit configuration is illustrated in a simplified form, the scan flip-flops actually lie scattered in the integrated circuit 10A. For this reason, in a case where the scan circuit is in the scan mode where the circuit works as a shift register, timing error tends to occur.

Figure 7:
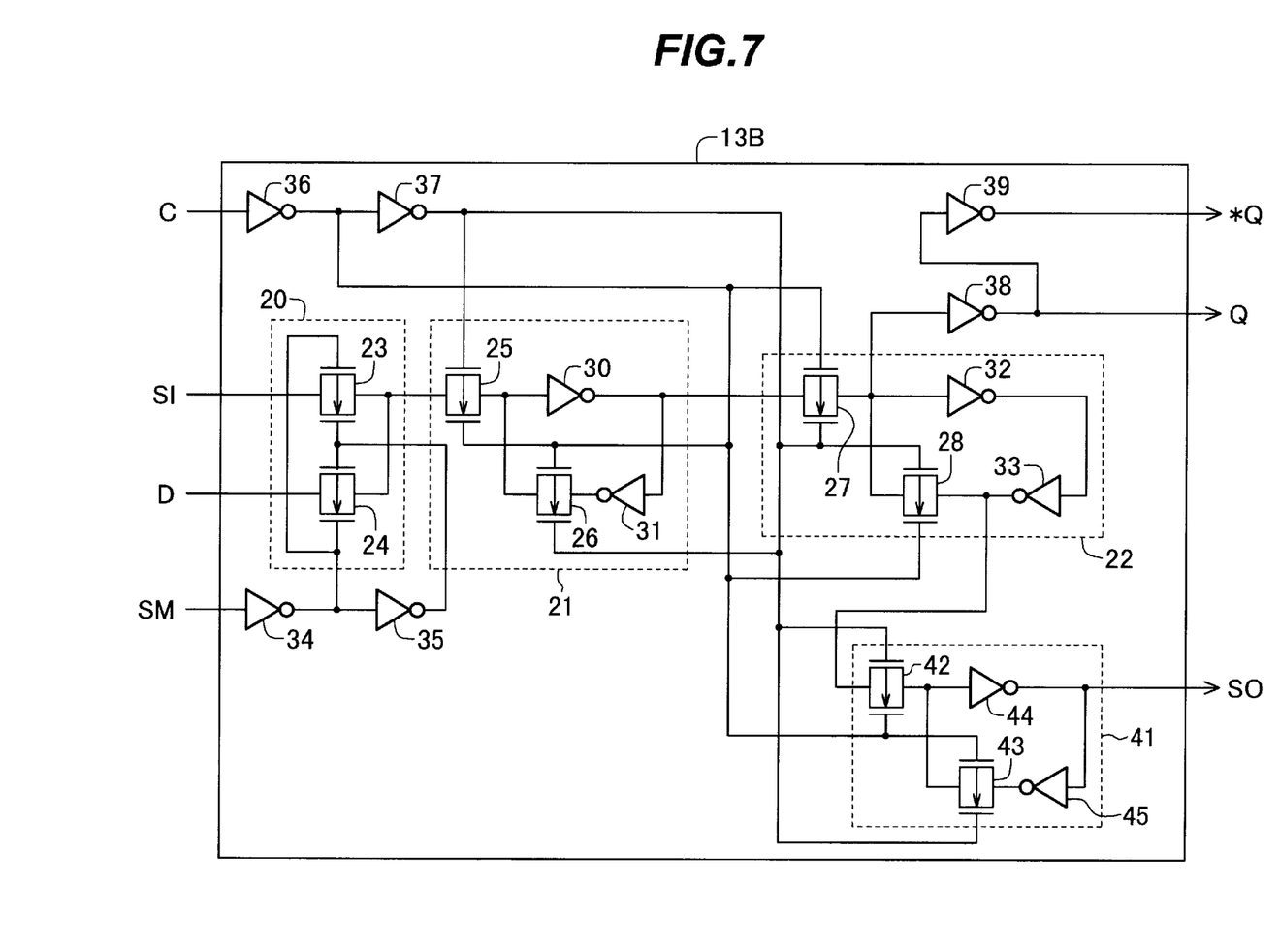
FIG. 7 is a circuit diagram of a scan flip-flop with a lock-up latch.

In a static timing analysis, the integrated circuit 10A is layout-designed, capacitance and resistance of wiring are calculated, thereby signal propagation delay times between cells are obtained, and thereafter whether or not timing error occurs is determined by calculation. In a case where it is determined that timing error occurs at an scan flip-flop, an scan flip-flop at the preceding stage is replaced by a cell of an scan flip-flop with a LUL (lock-up latch) 13B as shown in FIG. 7, for example, in order to cancel the error.

However, since the integrated circuit 10A is designed with a best fit layout and the scan flip-flop with a LUL is larger than an ordinary scan flip-flop in cell area, overlapping with an adjacent cell by cell replacement tends to occur. For this reason, rearrangement of cells and relayout of wiring become required, thereby leading to a possibility of causing a new timing error. If timing error occurs, requirement arises for redesigning and each time of layout design, timing verification and timing adjustment are to be followed, causing increase in development time.

This problem can be solved by constructing the scan circuit employing only scan flip-flops with LUL from the beginning.

In this case, however, a new problem occurs since not only does a circuit area increase but power consumption is also enhanced.

Especially, since delivery with short lead times is requested in a case of ASIC, requirement arises for a shorter development time for an integrated circuit. Furthermore, an integrated circuit for use in portable electronic equipment is required to be of lower power consumption for the purpose of a longer lifetime of a battery.

SUMMARY OF THE INVENTION

Accordingly, it is an object of the present invention to provide a method for layout design and timing adjustment of a logically designed integrated circuit capable of achieving both of a shorter development time and lower power consumption in a trade-off relation to each other.

In one aspect of the present invention, there is provided a method for layout design and timing adjustment of a logically designed integrated circuit including a first logic circuit, the first logic circuit including a plurality of flip-flops, the method comprising the steps of: (a) preparing cell data of first and second scan flip-flops, the second scan flip-flop comprising the first scan flip-flop and a latch circuit added to at a scan-out section of the first scan flip-flop; (b) producing a second logic circuit from the first logic circuit by replacing the plurality of flip-flops with respective the second scan flip-flops, and by connecting the plurality of scan second flip-flops in cascade to each other to construct a first scan circuit; (c) designing a layout of the second logic circuit; (d) obtaining a third logic circuit from the second logic circuit by replacing the second scan flip-flops with respective the first scan flip-flops to form a second scan circuit; and (e) performing a static timing analysis on the third logic circuit to adjust timing.

According to this configuration, since the second scan flip-flop is larger than the first scan flip-flop in cell area, no necessity arises for rearrangement of cells or relayout of clock wiring due to timing adjustment, thereby enabling reduction in the number of repetitions of timing adjustment and relayout, and decreasing in development time for an integrated circuit.

Moreover, since the second scan flip-flop is employed in only a part necessary for timing adjustment, lower power consumption in an integration circuit can be realized.

Therefore, both of a shorter development time and lower power consumption, which were in a trade-off relation to each other in the prior art, can be achieved.

Other aspects, objects, and the advantages of the present invention will become apparent from the following detailed description taken in connection with the accompanying drawings.

DESCRIPTION OF THE PREFERRED EMBODIMENT

Referring now to the drawings, wherein like reference characters designate like or corresponding parts throughout several views, preferred embodiments of the present invention are described below.

Figure 1:
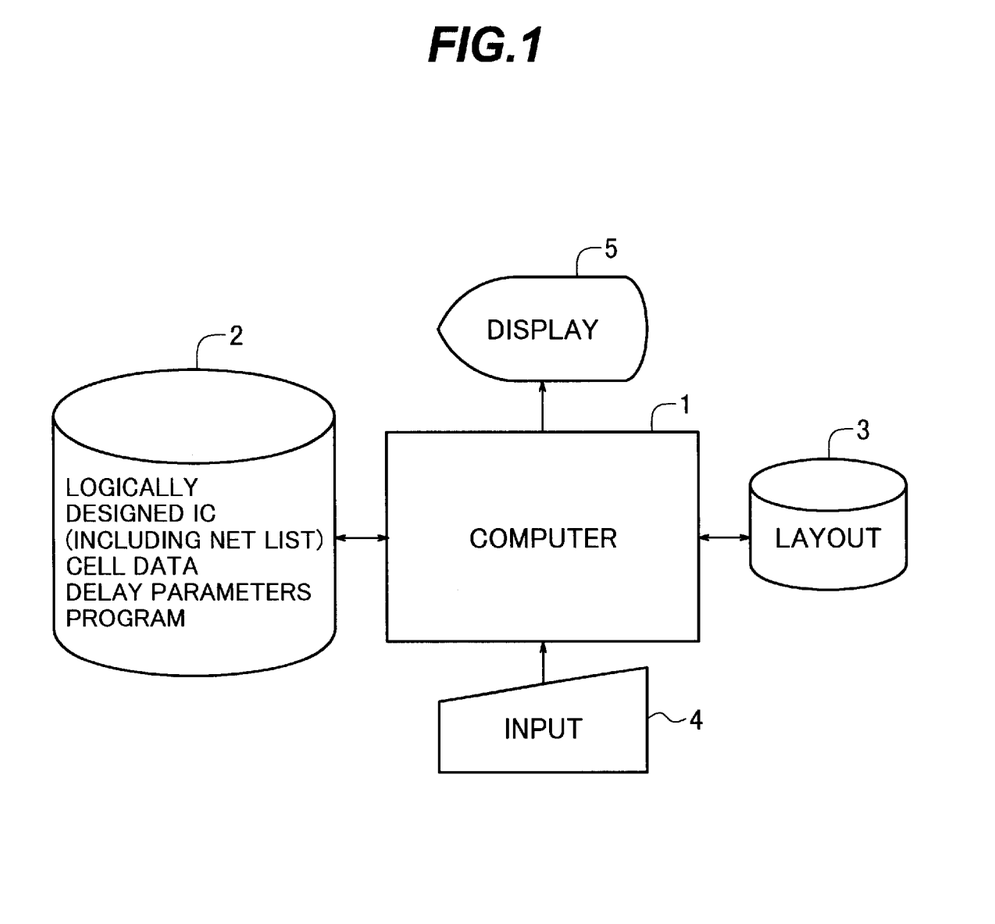
FIG. 1 is a schematic block diagram showing a hardware configuration of an apparatus for a layout design and timing adjustment of a logically designed integrated circuit of an embodiment according to the present invention.

FIG. 1 is a schematic block diagram showing a hardware configuration of an apparatus for a layout design and timing adjustment of a logically designed integrated circuit, of an embodiment according to the present invention.

This integrated circuit is one that can be automatically laid out by a computer 1 and is, for example, an ASIC employing a gate array.

A hardware configuration of this apparatus is a general computer system comprising the computer 1 coupled to a storage device 2 in which input data and programs are stored; a storage device 3 in which layout data as a processing result is stored; an input device 4 for instructions to the computer 1 by an operator; and a display device 5 presenting information such as contents of the instructions and progress status.

The input data includes: data of the logically designed integrated circuit 10 as shown in FIG. 3 for example (including a net list); cell data (including a cell delay time); and values of coefficients (delay parameters) in calculation formulas for wiring resistivity and inter-wiring capacitance for use in calculating an inter-gate signal propagation time on the basis of a layout design. The cell data is data of cells constituting a scan circuit and cells connected to the scan circuit, and includes data of cells of a scan flip-flop 13A as shown in FIG. 6 and an scan flip-flop with LUL 13B as shown in FIG. 7; data of a cell of a buffer gate for use in timing adjustment; and data of cells, in a combinational circuit 11, connected to the scan circuit. Data of a logically designed integrated circuit and a layout stored in the respective storage devices 2 and 3 are updated as described later.

Meanwhile, schematic description will be given of the scan flip-flop shown in FIG. 6.

The scan flip-flop 13A is of a master-slave type and has a known configuration, including a selector 20 selectively outputting one of signals at a data input end D and a scan-in end SI according to a scan mode SM; a master latch circuit 21 receiving the output of the selector 20; and a slave latch circuit 22 receiving the output of the circuit 21. In FIG. 6, each of reference characters 23 to 28 indicates a transfer gate composed of a PMOS transistor and an NMOS transistor connected in parallel to each other, and each of reference characters 30 to 40 indicates a CMOS inverter.

In the above configuration, when the scan mode signal SM is high, the transfer gates 23 and 24 are on and off, respectively, to select a signal at the scan-in end SI, while when the scan mode is low, the transfer gates 23 and 24 are off and on, respectively, to select a signal at the data input end D.

When a clock input end C is low, the transfer gates 25 to 28 are on, off, off and on, respectively, to capture the output of the selector 20 into the master latch circuit 21 with the slave latch circuit 22 holding data. Next, when the clock input end C goes high, the transfer gates 25 to 28 enter into the respective inverted states from the above states, and thereby the master latch circuit 21 latches the input data and the slave latch circuit 22 captures the output data of the master latch circuit 21. The logic values at the data output end Q and the scan-out end SO are equal to that of the output of the inverter 32, and the logic value at a data output end Q* is the inversion of that at the data output end Q.

A scan flip-flop with LUL 13B of FIG. 7 has a configuration of FIG. 6 in which the inverter 40 is replaced with a LUL latch circuit consisting of transfer gates 42 and 43 and inverters 44 and 45. On and off of the transfer gates 42 and 43 are the inverse of those of the transfer gates 27 and 28, respectively, of the slave latch circuit 22, and when the slave latch circuit 22 holds data, the LUL latch circuit 41 captures the output of the slave latch circuit 22, while when the slave latch circuit 22 captures its input, the LUL latch circuit 41 holds data. With such operation, the signal at the scan-out end SO lags behind the signal at the data output end Q by a half cycle of the clock signal.

Figure 2:
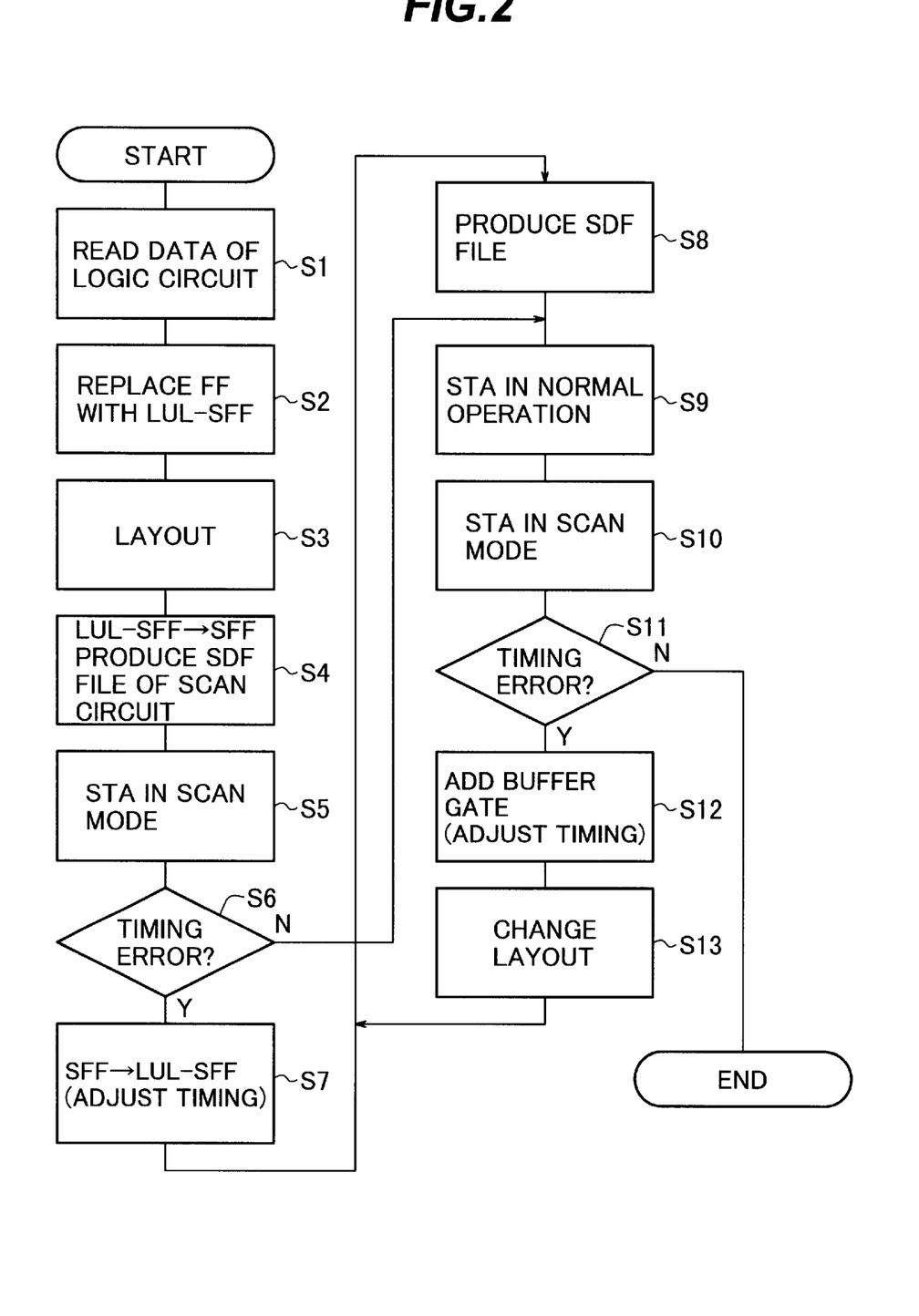
FIG. 2 is a schematic flow chart showing a procedure of a computer program.

FIG. 2 is a schematic flow chart showing a procedure of a computer program.

The computer 1 loads the program stored in the storage device 2 in response to an instruction from the input device 4 to execute the program so as to perform the following procedure.

(S1) Data of a logically designed circuit is read from the storage device 2. This circuit is, for example, the integrated circuit 10 as shown in FIG. 3, including a combinational circuit 11 and a sequential circuit constituted of flip-flops 12 to 15. Although the both circuits are separately shown for simplicity in FIG. 3, many of flip-flops lie scattered in the integrated circuit 10 in actuality.

Figure 4:
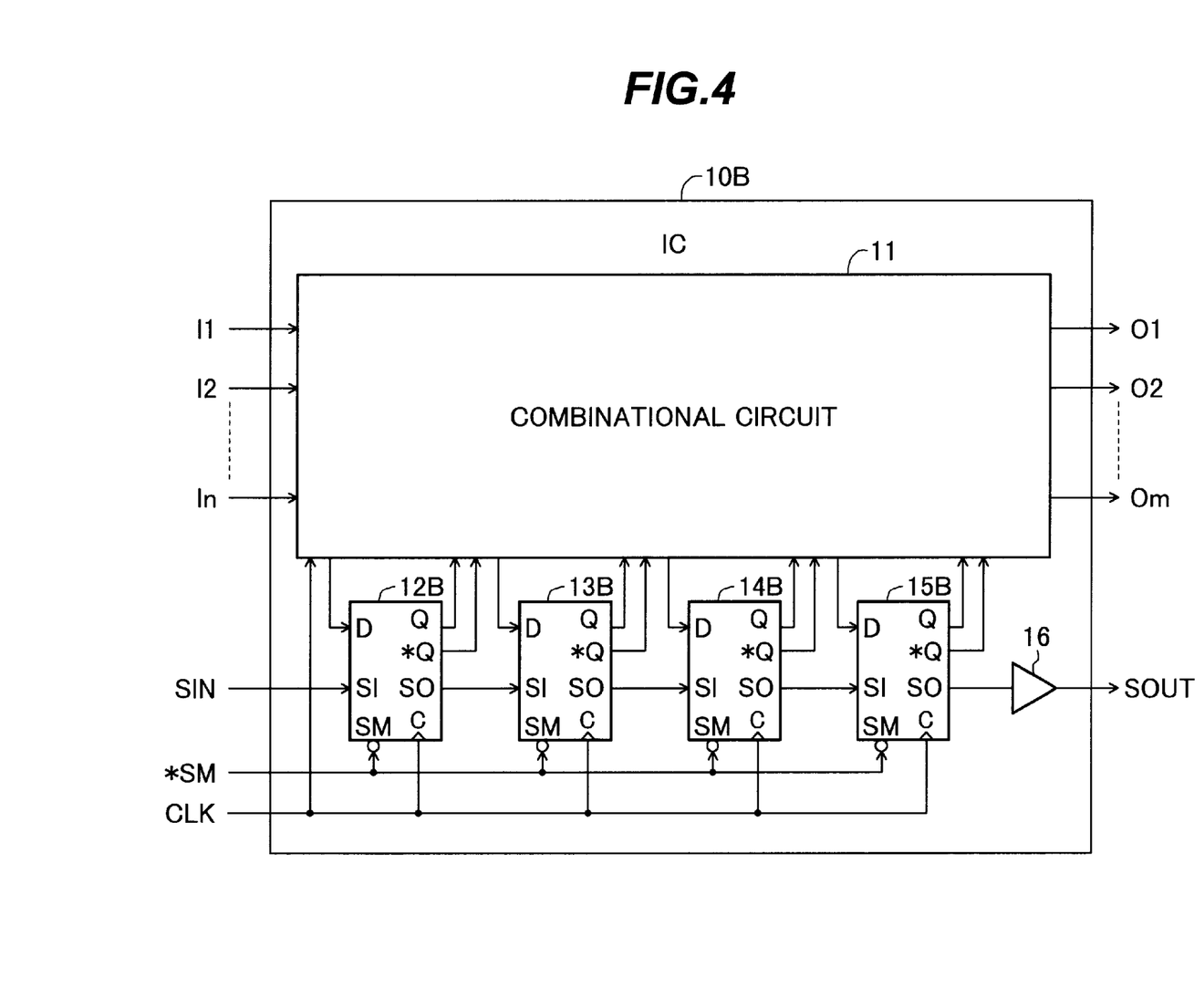
FIG. 4 is an illustration of step S2 in FIG. 2.

(S2) The flip-flops 12 to 15 are replaced with respective scan flip-flops with LUL 12B to 15B as shown in FIG. 4, and the scan flip-flops with LUL 12B to 15B are cascaded with respect to the scan-in end SI and the scan-out end SO to form a scan circuit. In this scan circuit, the scan-in end SI of the scan flip-flop 12B at the first stage is connected to the scan-in input terminal SIN of an integrated circuit 10B and the scan-out end SO of the scan flip-flop 15B with LUL at the last stage is connected through a buffer gate 16 to a scan-out terminal SOUT of the integrated circuit 10B. Furthermore, the scan mode ends SM of the scan flip-flops with LUL 12B to 15B are connected to the scan mode input terminal *SM of the integrated circuit 10B. The scan flip-flops with LUL are of the same configuration as each other.

The data in the storage device 2 is updated by changing the data of a logic circuit already stored with the data of a logic circuit having the scan circuit.

(S3) The integrated circuit 10B of FIG. 4 is layout-designed to store the result into the storage device 3.

By the layout design, a placement region is secured for the scan flip-flops with LUL 12B to 15B which has larger size than that of the ordinary scan flip-flops, and therefore as described later, after the scan flip-flops with LUL 12B to 15B have been replaced with the respective scan flip-flops 12A to 15A, even if some of the latter are replaced with the scan flip-flops with LUL in order to adjust timing, no necessity arises for rearrangement of cells and relayout of clock wiring in step S13 described later.

(S4) For a scan circuit in which the scan flip-flops with LUL 12B to 15B are replaced with the respective scan flip-flops 12A to 15A as shown in FIG. 5, a standard delay format (SDF) file is produced that includes signal propagation delay times of and between cells when the scan mode signal SM is low (in the scan mode). This replacement is reflected in the logic circuit stored in the storage device 2. Although the name of cells changes by this replacement, neither the number of input/output pins of each cell nor the name of each pin changes. Cell delay times are obtained by reading out data included in cell data of a scan flip-flop stored in the storage device 2. Delay times between gates are obtained on the basis of a net list stored in the storage device 2, shapes and sizes of the net in the layout of step 3, and the above delay parameter values stored in the storage device 2. The reason why the layout is not updated to be one which is after the cell replacement, is because an influence of the updating is small and timing adjustment is performed in company with the change in layout at step S12 described later.

(S5) A static timing analysis is performed on the scan circuit of FIG. 5 in the scan mode by a static timing analyzer (STA routine).

(S6) If timing error has occurred through this static timing analysis, then the process goes to step S7, or else the process goes to step S9. Timing error occurs in an ordinary case.

Figure 8:
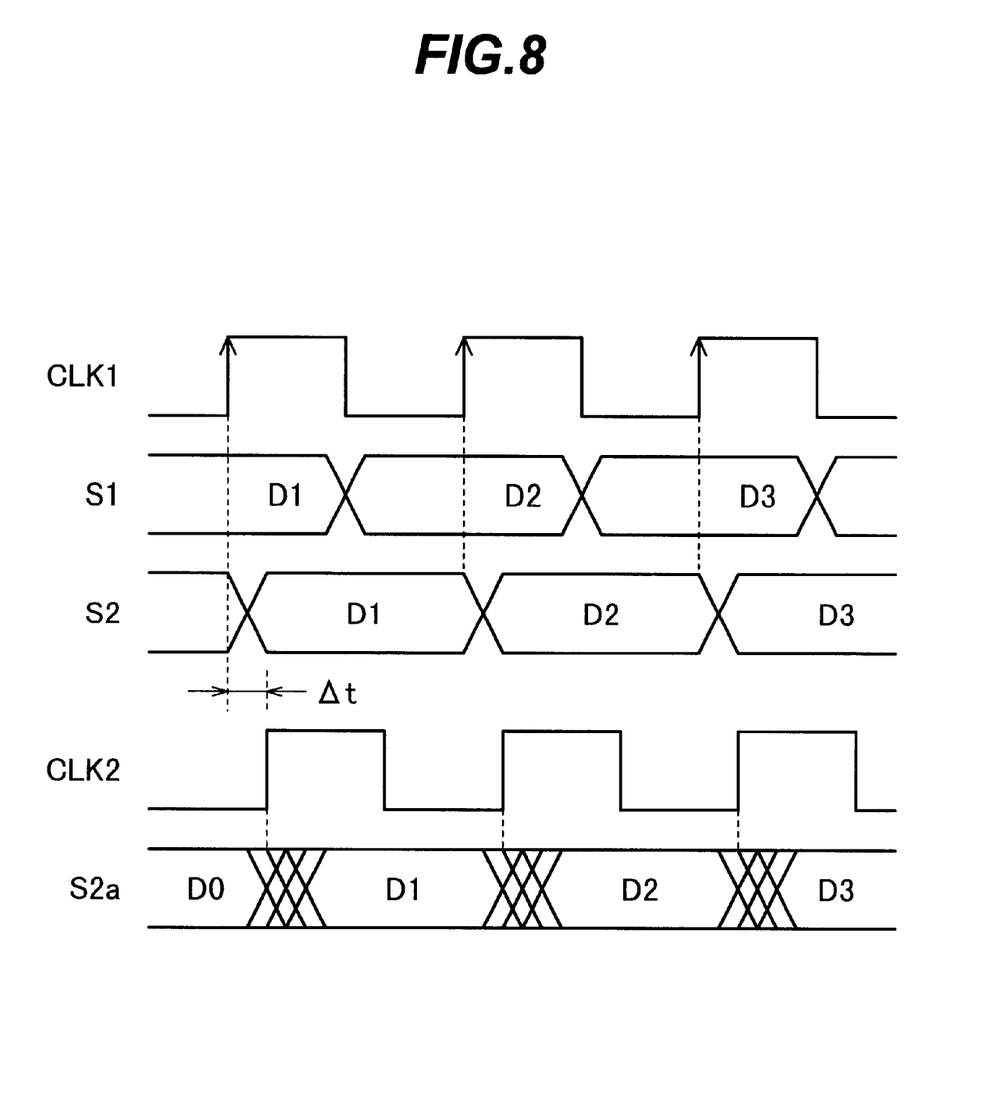
FIG. 8 is a timing chart showing a case where a timing error occurs at the scan flip-flop 14A of FIG. 5.

FIG. 8 is a timing chart showing a case where a timing error occurs at the scan flip-flop 14A of FIG. 5, and shows a clock signal CLK1 at the clock input end C, scan data signals S1 and S2 at the respective scan-in end SI and the scan-out end SO of the scan flip-flop 13A; and a clock signal CLK2 at the clock input end C and a scan data signal S2$a$ at the scan-in end SI of the scan flip-flop 14A.

The scan data signal S1 is held as S2 on a rise of the clock signal CLK1. The clock signal CLK2 lags behind the clock signal CLK1 by Δt. The scan data signal S2$a$ also lags behind S2. Since in an actual circuit, a delay amount of the scan data signal S2$a$ is varied with variations in process parameters and temperature (although Δt is also varied, it is assumed constant in FIG. 8 for simplicity), the variation of S2$a$ on time axis is considered in determination on whether or not timing error occurs.

For example, when the scan flip-flop 13A latches a binary D1 on a rise of the clock signal CLK1, the scan flip-flop 14A should latch a binary D0 of the scan data signal S2$a$ on a rise of the clock signal CLK2. In a case of FIG. 8, however, since the scan flip-flop 14A may not be able to latch it, it is determined that timing error (hold error) occurs at the scan flip-flop 14A.

(S7) Timing adjustment is performed by replacing the scan flip-flop 13A, which is disposed at the preceding stage of the scan flip-flop 14A where the timing error occurs, with the scan flip-flop with LUL 13B. As the same as step 4, this replacement is reflected only in the logic circuit stored in the storage device 2 (a circuit change), but not reflected in the layout.

Figure 9:
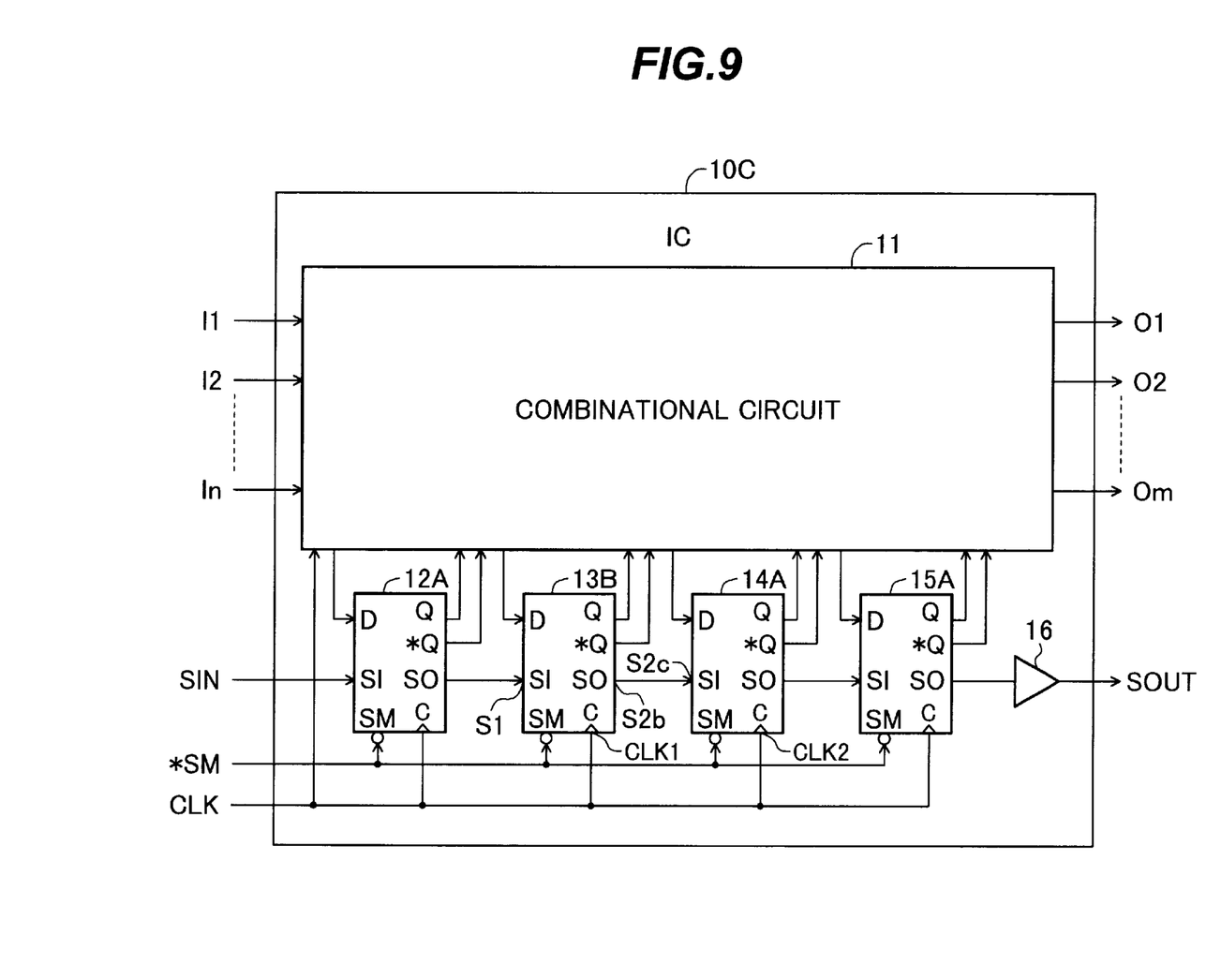
FIG. 9 is an illustration of step S7 in FIG. 2.

FIG. 9 shows an integrated circuit 10C having a configuration of FIG. 5 in which the scan flip-flop 13A is replaced with the scan flip-flop with LUL 13B.

Figure 10:
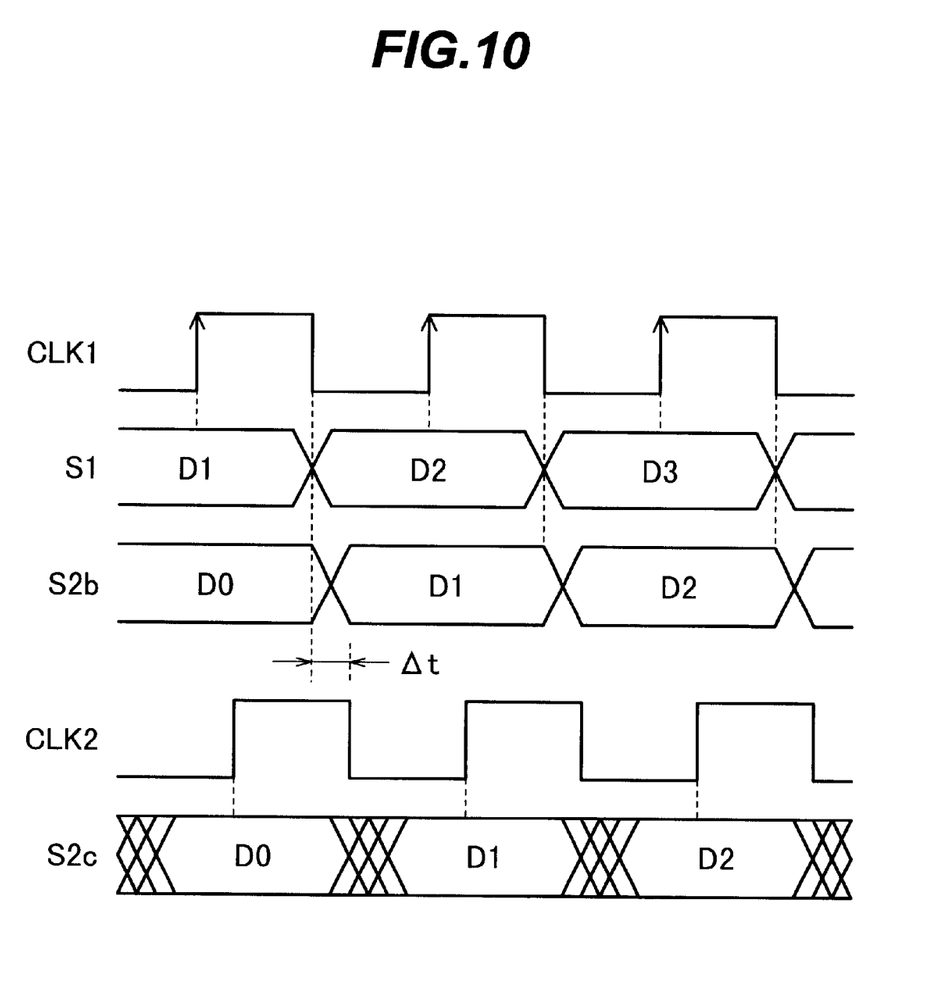
FIG. 10 is a timing chart showing a case where a timing error has been resolved at a scan circuit of FIG. 9.

FIG. 10 is a timing chart showing a case where the timing error at the scan flip-flop 14A of FIG. 9 has been resolved by this replacement, and showing a clock signal CLK1 at the clock input end C, scan data signals S1 and S2$b$ at the respective scan-in end SI and the scan-out end SO of the scan flip-flop with LUL 13B; and a clock signal CLK2 at the clock input end C and a scan data signal S2$c$ at the scan-in end SI of the scan flip-flop 14A.

Since the scan flip-flop with LUL 13B latches data on a fall of the clock signal CLK1 at the LUL latch circuit 41 as described above, the scan data S2$b$ lags behind the signal S2 of FIG. 8 by a half cycle and thereby, the scan flip-flop 14A can latch the scan data signal S2$c$ on a rise of the clock signal CLK2, thus correcting the timing error. (S8) An SDF file is produced in a similar manner to that at step S4 in regard to the sequential circuit after the change at step S7 (the scan flip-flops 12A, 13B, 14A and 15A of FIG. 9) and cells connected to the sequential circuit.

(S9) A static timing analysis is performed on the sequential circuit when the scan mode input terminal *SM is high (normal operation mode).

(S10) Since the circuit was changed in step S7, a possibility arises that a new timing error occurs in the sequential circuit in a case of the scan mode. Therefore, a static timing analysis in the scan mode is performed on the scan circuit.

(S11) If no timing error occurred at steps S9 and S10, then the process is terminated, or else the process goes to step S12.

Figure 11:
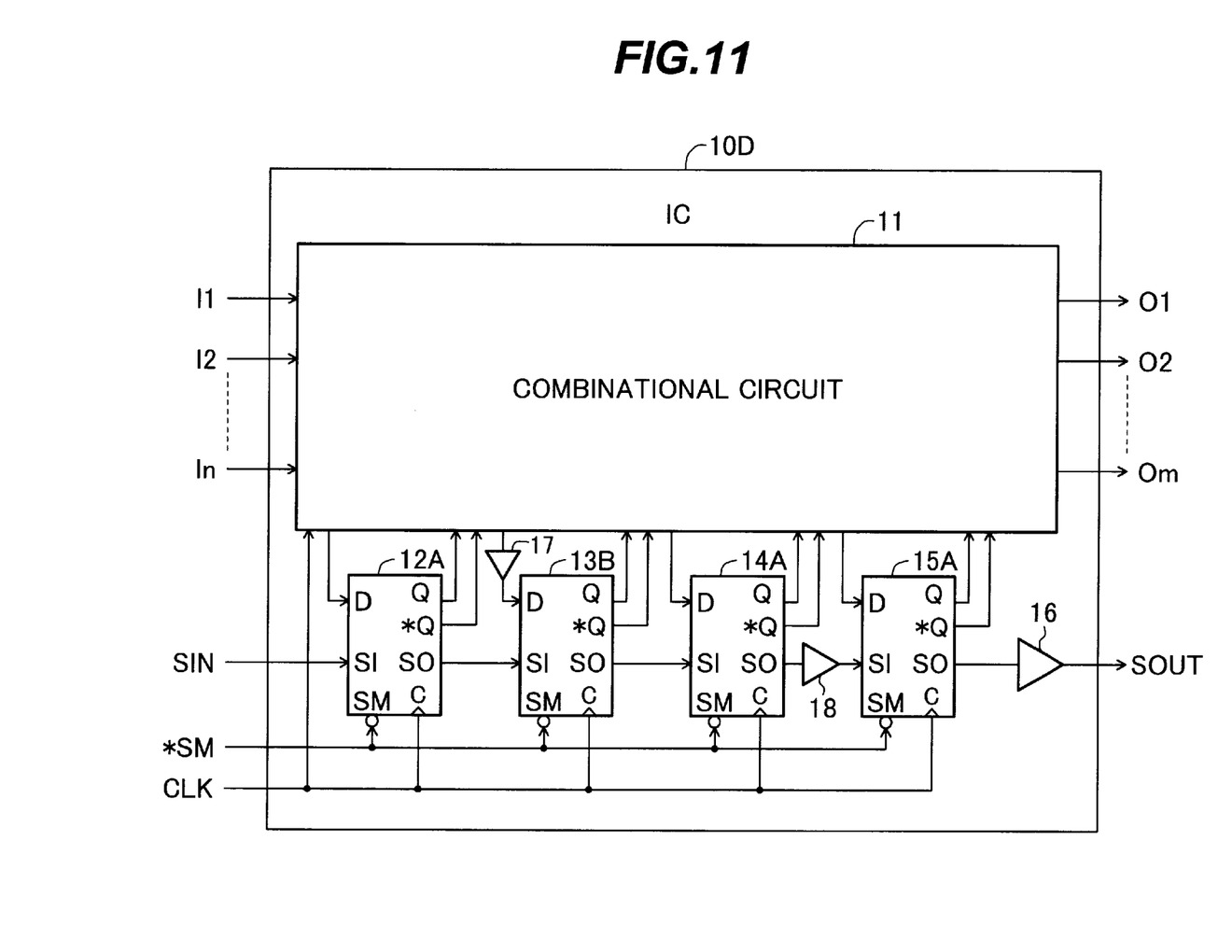
FIG. 11 is an illustration of step S12 in FIG. 2.

(S12) If timing error was occurs at step S9 or S10, timing is adjusted by adding a buffer gate to delay the signal. FIG. 11 shows a case where buffer gates 17 and 18 are added to cope with timing error in respective steps S9 and S10. Each of the buffer gates 17 and 18 is constructed of an even number of inverters connected in cascade. Since timing adjustment has been performed in step S7 using the scan flip-flop with LUL 13B, fine timing adjustment in the scan mode at this step S12 is performed and in a case where timing adjustment is necessary, it is enough to add a buffer gate.

(S13) According to this change in circuit, the layout is changed using the buffer cell stored in the storage device 2. In the first processing of the loop from steps S8 to S13, the layout is changed using cells of an scan flip-flop and an scan flip-flop with LUL stored in the storage 2 when the changes in circuit at steps S4 and S7 were performed. Then, the process returns to step S8.

According to this embodiment, after layout design of a circuit including a scan circuit formed with scan flip-flops with LUL as shown in FIG. 4, the scan flip-flops with LUL is replaced with the ordinary scan flip-flops to convert to the circuit shown in FIG. 5, and a static timing analysis is performed on this converted circuit, and if timing error occurs, a corresponding scan flip-flop is replaced with an scan flip-flop with LUL; therefore, no necessity arises for rearrangement of cells or relayout of clock wiring due to the replacement, thereby enabling reduction in number of repetitions of the loop from steps S8 to S13 to decrease a development term for an integrated circuit.

Furthermore, since a scan flip-flop with LUL is used only in a necessary part, power consumption of the integrated circuit can be reduced.

In addition, since a change in circuit is reflected in the layout at step S13 while not reflected in the layout at steps S4 and S7, a processing time can be shorter than in a case where the layout is changed each time the circuit is changed.

Although preferred embodiment of the present invention has been described, it is to be understood that the invention is not limited thereto and that various changes and modifications may be made without departing from the spirit and scope of the invention.

For example, a change in circuit may be reflected in the layout at each of steps S4 and S7 in FIG. 2.

Moreover, at step S7 in FIG. 2, if the following relation is met:

(the cell area of an scan flip-flop with LUL)−(the cell area of an ordinary scan flip-flop)≧(a total area of one or more buffer cells capable of correcting timing error), one or more buffer cells may be added instead of the scan flip-flop with LUL to perform timing adjustment.

Furthermore, although in the embodiment, description is given of a case where an integrated circuit is constructed with a gate array, the present invention can also be applicable to an integrated circuit of a standard cell type or a full custom integrated circuit that can be automatically laid out by a computer.

What is claimed is:

1. A method for layout design and timing adjustment of a logically designed integrated circuit comprising a first logic circuit, said first logic circuit comprising a plurality of flip-flops, each having a master latch circuit and a slave latch circuit, said method comprising:

preparing cell data of first and second scan flip-flops, said second scan flip-flop comprising said master latch circuit, said slave latch circuit cascaded to said master latch circuit, and a latch circuit connected to said slave latch circuit, wherein said latch circuit operates in a reverse state of said slave latch circuit of said second scan flip-flop with respect to holding and capturing;

producing a second logic circuit from said first logic circuit by replacing said plurality of flip-flops with respective said second scan flip-flops, and by connecting said plurality of second scan flip-flops in cascade to each other to construct a first scan circuit;

designing a layout of said second logic circuit;

obtaining a third logic circuit from said second logic circuit by replacing said second scan flip-flops with respective said first scan flip-flops to form a second scan circuit; and performing a static timing analysis on said third logic circuit to adjust timing.

2. The method of claim 1, wherein said performing of the static timing analysis comprises:

determining a first signal propagation delay time between cascaded adjacent cells of said second scan circuit in a scan mode on the basis of a net list of said second logic circuit and said layout of said second logic circuit;

performing said static timing analysis on said second scan circuit in said scan mode on the basis of said first signal propagation delay time and a cell delay time of said first scan flip-flop; and adjusting said timing by replacing a first scan flip-flop at the preceding stage of a first scan flip-flop at which a timing error is found with a second scan flip-flop to change said second scan circuit to a third scan circuit, wherein a fourth logic circuit is obtained from said third logic circuit by replacing said second scan circuit with said third scan circuit.

3. The method of claim 2, wherein said performing of the static timing analysis further comprises:

determining a second signal propagation delay time between cascaded adjacent cells of a cell group comprising cells of said second scan circuit and a cell connected to said second scan circuit on the basis of a net list of said fourth logic circuit and said layout of said second logic circuit, and performing said static timing analysis on said third scan circuit in each of said scan mode and a normal operation mode on the basis of said second signal propagation delay time and a cell delay time of each cell of said cell group; and adjusting said timing by inserting a buffer cell between a first or second scan flip-flop at which said timing error occurs and a first or second flip-flop at the preceding stage of said first or second scan flip-flop at which said timing error occurs.

4. An apparatus for layout design and timing adjustment of a logically designed first integrated circuit comprising a first logic circuit, said first logic circuit comprising a plurality of flip-flops, each having a master latch circuit and a slave latch circuit, said apparatus comprising:

a storage device storing data of said first logic circuit, cell data of first and second scan flip-flops, said second scan flip-flop comprising said master latch circuit, said slave latch circuit cascaded to said master latch circuit, and a latch circuit connected to said slave latch circuit, and a computer program, wherein said latch circuit operates in a reverse state of said slave latch circuit of said second scan flip-flop with respect to holding and capturing; and a computer executing said computer program;

wherein said computer program causes said computer to perform:

inputting said stored data;

producing a second logic circuit from said first logic circuit by replacing said plurality of flip-flops with respective said second scan flip-flops, and by connecting said plurality of scan second flip-flops in cascade to each other to construct a first scan circuit;

designing a layout of said second logic circuit;

obtaining a third logic circuit from said second logic circuit by replacing said second scan flip-flops with respective said first scan flip-flops to form a second scan circuit; and performing a static timing analysis on said third logic circuit to adjust timing.

5. The apparatus of claim 4, wherein said performing of the static timing analysis comprises:

determining a first signal propagation delay time between cascaded adjacent cells of said second scan circuit in a scan mode on the basis of a net list of said second logic circuit and said layout of said second logic circuit;

performing said static timing analysis on said second scan circuit in said scan mode on the basis of said first signal propagation delay time and a cell delay time of said first scan flip-flop; and adjusting said timing by replacing a first scan flip-flop at the preceding stage of a first scan flip-flop at which a timing error is found with a second scan flip-flop to change said second scan circuit to a third scan circuit, wherein a fourth logic circuit is obtained from said third logic circuit by replacing said second scan circuit with said third scan circuit.

6. The apparatus of claim 5, wherein said performing of the static-timing analysis further comprises:

determining a second signal propagation delay time between cascaded adjacent cells of a cell group comprising cells of said second scan circuit and a cell connected to said second scan circuit on the basis of a net list of said fourth logic circuit and said layout of said second logic circuit, and performing said static timing analysis on said third scan circuit in each of said scan mode and a normal operation mode on the basis of said second signal propagation delay time and a cell delay time of each cell of said cell group; and adjusting said timing by inserting a buffer cell between a first or second scan flip-flop at which said timing error occurs and a first or second flip-flop at the preceding stage of said first or second scan flip-flop at which said timing error occurs.

7. A computer program product, comprising:

a computer readable storage medium having a computer program stored thereon for causing a computer to perform layout design and timing adjustment of a logically designed first integrated circuit comprising a first logic circuit, said first logic circuit comprising a plurality of flip-flops, each having a master latch circuit and a slave latch circuit, wherein said computer program causes said computer to perform:

inputting data of said first logic circuit and cell data of first and second scan flip-flops, said second scan flip-flop comprising said master latch circuit, said slave latch circuit cascaded to said master latch circuit, and a latch circuit connected to said slave latch circuit, wherein said latch circuit operates in a reverse state of said slave latch circuit of said second scan flip-flop with respect to holding and capturing;

producing a second logic circuit from said first logic circuit by replacing said plurality of flip-flops with respective said second scan flip-flops, and by connecting said plurality of scan second flip-flops in cascade to each other to construct a first scan circuit;

designing a layout of said second logic circuit;

obtaining a third logic circuit from said second logic circuit by replacing said second scan flip-flops with respective said first scan flip-flops to form a second scan circuit;

performing a static timing analysis on said third logic circuit to adjust timing; and outputting a result of the timing adjustment.

8. The computer program product of claim 7, wherein said performing of the static timing analysis comprises:

determining a first signal propagation delay time between cascaded adjacent cells of said second scan circuit in a scan mode on the basis of a net list of said second logic circuit and said layout of said second logic circuit;

performing said static timing analysis on said second scan circuit in said scan mode on the basis of said first signal propagation delay time and a cell delay time of said first scan flip-flop; and adjusting said timing by replacing a first scan flip-flop at the preceding stage of a first scan flip-flop at which a timing error has been is found with a second scan flip-flop to change said second scan circuit to a third scan circuit, wherein a fourth logic circuit is obtained from said third logic circuit by replacing said second scan circuit with said third scan circuit.

9. The computer program product of claim 8, wherein said performing of the static timing analysis further comprises:

determining a second signal propagation delay time between cascaded adjacent cells of a cell group comprising cells of said second scan circuit and a cell connected to said second scan circuit on the basis of a net list of said fourth logic circuit and said layout of said second logic circuit, and performing said static timing analysis on said third scan circuit in each of said scan mode and a normal operation mode on the basis of said second signal propagation delay time and a cell delay time of each cell of said cell group; and adjusting said timing by inserting a buffer cell between a first or second scan flip-flop at which said timing error has occurred and a first or second flip-flop at the preceding stage of said first or second scan flip-flop at which said timing error occurs.

10. A computer readable storage medium having a computer program stored thereon for causing a computer to perform layout design and timing adjustment of a logically designed first integrated circuit comprising a first logic circuit, said first logic circuit comprising a plurality of flip-flops, each having a master latch circuit and a slave latch circuit, wherein said computer program causes said computer to perform a process of:

inputting data of said first logic circuit and cell data of first and second scan flip-flops, said second scan flip-flop comprising said master latch circuit, said slave latch circuit cascaded to said master latch circuit, and a latch circuit connected to said slave latch circuit, wherein said latch circuit operates in a reverse state of said slave latch circuit of said second scan flip-flop with respect to holding and capturing;

producing a second logic circuit from said first logic circuit by replacing said plurality of flip-flops with respective said second scan flip-flops, and by connecting said plurality of scan second flip-flops in cascade to each other to construct a first scan circuit;

designing a layout of said second logic circuit;

obtaining a third logic circuit from said second logic circuit by replacing said second scan flip-flops with respective said first scan flip-flops to form a second scan circuit;

performing a static timing analysis on said third logic circuit to adjust timing; and outputting a result of the timing adjustment.

11. The computer readable storage medium of claim 10, wherein said performing of the static timing analysis comprises:

determining a first signal propagation delay time between cascaded adjacent cells of said second scan circuit in a scan mode on the basis of a net list of said second logic circuit and said layout of said second logic circuit;

performing said static timing analysis on said second scan circuit in said scan mode on the basis of said first signal propagation delay time and a cell delay time of said first scan flip-flop; and adjusting said timing by replacing a first scan flip-flop at the preceding stage of a first scan flip-flop at which a timing error has been is found with a second scan flip-flop to change said second scan circuit to a third scan circuit, wherein a fourth logic circuit is obtained from said third logic circuit by replacing said second scan circuit with said third scan circuit.

12. The computer readable storage medium of claim 11, wherein said performing of the static timing analysis further comprises:

determining a second signal propagation delay time between cascaded adjacent cells of a cell group comprising cells of said second scan circuit and a cell connected to said second scan circuit on the basis of a net list of said fourth logic circuit and said layout of said second logic circuit, and performing said static timing analysis on said third scan circuit in each of said scan mode and a normal operation mode on the basis of said second signal propagation delay time and a cell delay time of each cell of said cell group; and adjusting said timing by inserting a buffer cell between a first or second scan flip-flop at which said timing error has occurred and a first or second flip-flop at the preceding stage of said first or second scan flip-flop at which said timing error occurs.

* * * * *

UNITED STATES PATENT AND TRADEMARK OFFICE
CERTIFICATE OF CORRECTION

PATENT NO. : 6,687,890 B2
DATED : February 3, 2004
INVENTOR(S) : Hiroshi Sato

Page 1 of 1

It is certified that error appears in the above-identified patent and that said Letters Patent is hereby corrected as shown below:

Column 9,
Line 27, delete "has been".

Column 10,
Line 35, delete "has been".

Signed and Sealed this

Fifteenth Day of June, 2004

JON W. DUDAS
*Acting Director of the United States Patent and Trademark Office*